US008788156B2

(12) United States Patent
Nishimura

(10) Patent No.: US 8,788,156 B2
(45) Date of Patent: Jul. 22, 2014

(54) WHEEL LOADER

(71) Applicant: Komatsu Ltd., Tokyo (JP)

(72) Inventor: Kazunori Nishimura, Komatsu (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 13/825,657

(22) PCT Filed: Oct. 31, 2012

(86) PCT No.: PCT/JP2012/078152
§ 371 (c)(1),
(2), (4) Date: Mar. 22, 2013

(87) PCT Pub. No.: WO2014/049890
PCT Pub. Date: Apr. 3, 2014

(65) Prior Publication Data
US 2014/0129114 A1 May 8, 2014

(30) Foreign Application Priority Data
Sep. 28, 2012 (JP) ................................ 2012-215638

(51) Int. Cl.
| G06F 7/70 | (2006.01) |
| G06F 19/00 | (2011.01) |
| G06G 7/00 | (2006.01) |
| G06G 7/76 | (2006.01) |
| G06F 7/00 | (2006.01) |
| G06F 17/00 | (2006.01) |
| B66C 23/00 | (2006.01) |
| B66F 9/00 | (2006.01) |
| E02F 3/00 | (2006.01) |
| B60W 10/06 | (2006.01) |
| F02D 29/02 | (2006.01) |
| F02D 41/02 | (2006.01) |

(52) U.S. Cl.
CPC ............. *F02D 29/02* (2013.01); *B60W 10/06* (2013.01); *F02D 2200/501* (2013.01); *F02D 2200/50* (2013.01); *F02D 41/021* (2013.01); *F02D 2250/18* (2013.01); *F02D 2250/26* (2013.01)
USPC ................................. 701/50; 701/54; 414/699

(58) Field of Classification Search
CPC ......... E02F 1/00; E02F 9/2062; E02F 9/2066; E02F 9/207; E02F 9/2075; F02D 29/00
USPC ............ 414/680, 685, 687, 699, 700; 701/50, 701/54, 84, 101, 102; 180/337, 338
See application file for complete search history.

(56) References Cited

U.S. PATENT DOCUMENTS

| 7,533,527 B2 * | 5/2009 | Naruse ............................ 60/433 |
| 2009/0163319 A1 * | 6/2009 | Janasek ............................ 477/78 |
| 2009/0301075 A1 * | 12/2009 | Morinaga et al. ............... 60/459 |
| 2011/0029175 A1 * | 2/2011 | Kang et al. ....................... 701/22 |
| 2011/0029206 A1 * | 2/2011 | Kang et al. ....................... 701/50 |
| 2012/0177470 A1 * | 7/2012 | Ohhigashi et al. ............. 414/687 |
| 2012/0185141 A1 * | 7/2012 | Kamado et al. ................. 701/50 |
| 2012/0310495 A1 * | 12/2012 | Nakanishi et al. .............. 701/50 |

FOREIGN PATENT DOCUMENTS

| EP | 2 211 042 A1 | 7/2010 |
| JP | 11-101142 A | 4/1999 |
| JP | 2011-236759 A | 11/2011 |
| WO | 2005/024208 A1 | 3/2005 |
| WO | 2007/074608 A1 | 7/2007 |
| WO | 2012/117750 A1 | 9/2012 |

OTHER PUBLICATIONS

International Search Report of corresponding PCT Application No. PCT/JP2012/078152 Dec. 17, 2012.
The extended European Search Report for the corresponding European application No. 12846799.0, issued on Apr. 3, 2014.

* cited by examiner

Primary Examiner — Mahmoud Gimie
Assistant Examiner — Sizo Vilakazi
(74) Attorney, Agent, or Firm — Global IP Counselors, LLP

(57) ABSTRACT

Predetermined torque characteristics are obtained by multiplying by a predetermined ratio that is less than 100%, the upper value of engine output torque from the engine output torque line, for at least part of the range of engine rotation speed. Torque upper value information defines the upper value of engine output torque that changes in conformance with vehicle speed and tractive farce. When predetermined conditions for determination are satisfied, an engine output torque control part controls engine output torque based on torque upper value information. The predetermined conditions for determination at the least include that a travel condition is forward travel, that a work condition is laden condition and that a raise operation is being performed by the working machine. When the predetermined conditions for determination are not satisfied the engine output torque control part controls engine output torque based on predetermined torque characteristics.

13 Claims, 8 Drawing Sheets

| TRACTIVE FORCE | VEHICLE SPEED ||||||||||
| --- | v1 | v2 | v3 | v4 | v5 | v6 | v7 | v8 | v9 | v10 |
| f1 | a | a | a | a | a | a | a | a | a | e |
| f2 | a | a | a | a | a | a | a | a | e | e |
| f3 | a | a | a | a | a | a | a | d | e | e |
| f4 | a | a | a | a | c | b | b | e | e | e |
| f5 | a | a | a | b | d | e | e | e | e | e |
| f6 | a | a | b | c | e | e | e | e | e | e |
| f7 | a | b | b | e | e | e | e | e | e | e |
| f8 | b | b | e | e | e | e | e | e | e | e |
| f9 | e | e | e | e | e | e | e | e | e | e |
| f10 | e | e | e | e | e | e | e | e | e | e |

FIG. 8

WHEEL LOADER

CROSS-REFERENCE TO RELATED APPLICATIONS

This application claims priority to Japanese Patent Application No. 2012-215638 filed on Sep. 28, 2012, the disclosure of which is hereby incorporated herein by reference in its entirety.

TECHNICAL FIELD

The present invention is related to a wheel loader.

BACKGROUND ART

Wheel loaders provide a travel mechanism that causes the vehicle to travel and a working machine that performs different kinds of work such as excavation etc. The travel mechanism and the working machine are driven by drive force from an engine. That is to say, drive force from the engine is distributed to the travel mechanism and the working machine. Thus output torque required for the engine differs in response to the conditions of usage of the travel mechanism and the working machine. Accordingly, there is a need to reduce fuel consumption in wheel loaders.

In the wheel loader disclosed in International publication WO2005/024208 a determination is made on whether the vehicle is performing excavation or traveling up a slope. Then, when the vehicle is performing excavation or traveling up a slope, the engine is controlled based on high output engine output torque line. When the vehicle is not either excavating or traveling up a slope the engine is controlled based on low output engine output torque line.

As in a working vehicle as described above, engine control is based on low output engine output torque line when the vehicle is neither excavating nor traveling up a slope, the quantity of fuel consumed is reduced thereby providing improved fuel economy. Further, when the vehicle is excavating or traveling up a slope the engine is controlled such that engine output torque line switches from low output torque line to high output torque line. This enables the high output torque necessary for excavating or traveling up a slope to be maintained, providing improved workability and travel ability.

SUMMARY

However, in the case of the above described working vehicle, when the engine output torque line is switched the engine output characteristics change substantially and may cause the operator to feel discomfort in operating the vehicle. For example, a wheel loader can be used to perform the work of scooping subject material such as earth and sand and the like into the bucket and loading it on the load carrying tray of a dump truck. Here, the wheel loader repeats a series of operations that includes excavation, reversing, approaching the dump truck (dump approach), discharging the load, and reversing.

In the dump approach stage of this work, the wheel loader operates to raise the working machine with the subject material loaded therein while it is traveling forward toward the dump truck. This means that the dump approach requires substantial engine output torque in comparison to the other operations. However, when performing a dump approach, if engine the output torque line switches from a torque line of low output to a torque line of high output, when switching during a dump approach and during another work operation the engine output characteristics will change substantially. If engine output characteristics change substantially in one part of the work in the series of work operations, the operator feels discomfort.

Moreover, even for the same work operation, the required engine output torque may vary depending on the condition of the vehicle. For example, in a dump approach, the required engine output torque differs when the vehicle advances at low vehicle speed from that required when the vehicle advances at high vehicle speed. In the case of the above described working vehicle however, when predetermined conditions are satisfied the switch to high output torque line is uniform. This is one factor that contributes to reduced fuel economy.

An object of the present invention is to provide a wheel loader with improved fuel economy and high level operability.

A wheel loader according to a first aspect of the present invention provides an engine, a travel mechanism, a working machine hydraulic pump, a working machine, a working machine operating part, a vehicle speed detection part, a tractive force detection part, a memory part, a travel condition determination part, a work condition determination part, a raise operation determination part and an engine output torque control part.

The travel mechanism causes the vehicle to travel utilizing the drive force from the engine. The working machine hydraulic pump is driven by the engine to discharge hydraulic fluid. The working machine is driven by hydraulic fluid discharged from the working machine hydraulic pump. The working machine operating part is a device for operating the working machine. The vehicle speed detection part detects vehicle speed. The tractive force detection part detects tractive force of the vehicle.

The memory part stores output torque line and torque upper value information. Output torque line defines the relationship between engine rotation speed and the upper value of engine output torque. Torque upper value information defines the upper value of engine output torque that changes in conformance with vehicle speed and tractive force.

The travel condition determination part determines whether or not the travel condition of the vehicle is forward travel. The work condition determination part determines whether or not the work condition of the working machine is laden condition. The raise operation determination part determines whether or not a raise operation is being performed from the working machine operating part in order to raise the working machine.

When predetermined conditions for determination are satisfied, the engine output torque control part controls engine output torque based on torque upper value information. The predetermined conditions for determination must at the least include that the travel condition is forward travel, that the work condition is laden condition and that a raise operation is being performed. When the predetermined conditions for determination are not satisfied the engine output torque control part controls engine output torque based on predetermined torque characteristics. The predetermined torque characteristics are obtained by multiplying by a predetermined ratio that is less than 100%, the upper value of engine output torque from the engine output torque line, for at least part of the range of engine rotation speed.

A wheel loader according to a second aspect of the present invention is the above described wheel loader in which the torque upper value information defines the upper value of engine output torque greater than or equal to the upper value of engine output torque from predetermined torque characteristics.

A wheel loader according to a third aspect of the present invention is the above described wheel loader in which the torque upper value information defines the upper value of engine output torque that changes in conformance with vehicle speed and tractive force, for a range between the upper value of engine output torque from output torque line and the upper value of engine output torque from predetermined torque characteristics.

A wheel loader according to a fourth aspect of the present invention is the above described wheel loader in which the torque upper value information defines the upper value of engine output torque that reduces in conformance with an increase in vehicle speed.

A wheel loader according to a fifth aspect of the present invention is the above described wheel loader in which the torque upper value information defines the upper value of engine output torque that decreases in conformance with an increase in tractive force.

A wheel loader according to a sixth aspect of the present invention is the above described wheel loader in which the torque upper value information defines the upper value of engine output torque at the same level as predetermined torque characteristics, in relation to vehicle speed that is within a range where vehicle speed is less than or equal to a predetermined vehicle speed threshold and tractive force is within a range that is more than or equal to a predetermined tractive force threshold.

A wheel loader according to a seventh aspect of the present invention is the above described wheel loader in which the torque upper value information defines the relationship between tractive force and vehicle speed and a reduction rate in relation to the upper value of engine output torque from the output torque line.

A wheel loader according to an eighth aspect of the present invention is the above described wheel loader in which output torque line includes a first constant horsepower line where engine output horsepower is constant at a first horsepower. The predetermined torque characteristics have characteristics such that, at a second horsepower, engine output horsepower is constant. The second horsepower is a value obtained by multiplying the first horsepower by a predetermined ratio that is less than 100%, taking the first horsepower as 100%. The reduction rate, in the torque upper value information, is the ratio by which the first horsepower is multiplied, which includes values that are less than 100% and greater than the predetermined ratio.

A wheel loader according to a ninth aspect of the present invention is the above described wheel loader in which the torque upper value information is mapped.

A wheel loader according to a tenth aspect of the present invention is the above described wheel loader in which the travel mechanism has a travel hydraulic pump and a hydraulic motor. The travel hydraulic pump is driven by the engine to discharge hydraulic fluid. The hydraulic motor is driven by hydraulic fluid discharged from the travel hydraulic pump.

A wheel loader according to an eleventh aspect of the present invention is the above described wheel loader further providing a hydraulic circuit. The hydraulic circuit includes a first drive circuit, a second drive circuit and a cutoff valve. When hydraulic fluid is supplied to a hydraulic motor from the travel hydraulic pump via the first drive circuit the hydraulic fluid returns to the travel hydraulic pump from the hydraulic motor via the second drive circuit. When hydraulic fluid is supplied to the hydraulic motor from the travel hydraulic pump via the second drive circuit the hydraulic fluid returns to the travel hydraulic pump from the hydraulic motor via the first drive circuit. The cutoff valve opens when either the hydraulic pressure of the first drive circuit or the hydraulic pressure of the second drive circuit is greater than or equal to a predetermined cutoff pressure. In this way, the cutoff valve adjusts such that the hydraulic pressure of the first drive circuit and the hydraulic pressure of the second drive circuit do not exceed the predetermined cutoff pressure.

The tractive force detection part calculates tractive force by multiplying maximum tractive force of the vehicle by a traction ratio. The tractive force detection part calculates the traction ratio based on the capacity of the hydraulic motor, the maximum capacity of the hydraulic motor, the pressure difference between the first drive circuit and the second drive circuit when the cutoff valve is open, and the current pressure difference between the first drive circuit and the second drive circuit.

A wheel loader according to a twelfth aspect of the present invention is the above described wheel loader in which the output torque line defines maximum output torque of the engine in relation to engine rotation speed.

A method for controlling a wheel loader related to a thirteenth aspect of the present invention comprises the following steps. A first step for detecting vehicle speed. A second step for determining the tractive force of the vehicle. A third step for determining whether or not the condition of travel of the vehicle is forward travel. A fourth step for determining whether or not the work condition of the working machine is laden condition. A fifth step for determining whether or not a raise operation is being performed in order to raise the working machine. A sixth step for determining whether or not the conditions for determination that include at least that the travel condition is forward travel, that the work condition is laden condition and that a raise operation is being performed are satisfied. A seventh step for controlling engine output torque based on torque upper value information when the conditions for determination are satisfied. An eighth step for controlling engine output torque based on predetermined torque characteristics when the conditions for determination are not satisfied. The output torque line defines the relationship between engine rotation speed and the upper value of engine output torque. The predetermined torque characteristics are obtained by multiplying by a predetermined ratio that is less than 100%, the upper value of engine output torque from the engine output torque line, for at least part of the range of engine rotation speed. The torque upper value information defines the upper value of engine output torque that changes in conformance with vehicle speed and tractive force.

In the wheel loader according to the first aspect of the present invention, when the conditions for determination are not satisfied engine output torque is controlled based on predetermined torque characteristics. The upper value of engine output torque from the predetermined torque characteristics is smaller than the upper value of engine output torque from the output torque line. This enables an improvement in fuel economy.

When the conditions for determination are satisfied engine output torque is controlled based on torque upper value information. The conditions for determination are conditions that show that the vehicle is performing a dump approach, thus, during a dump approach, engine output torque is controlled based on the torque upper value information. The torque upper value information defines the upper value of engine output torque that changes in conformance with vehicle speed and tractive force. For this reason, engine output torque can be appropriately controlled in conformance with the level of vehicle speed and tractive force. Accordingly, regardless of the level of vehicle speed and tractive force, fuel economy is improved in comparison to the case in which engine output torque is controlled based on the output torque line. Further, operability is improved in comparison to the case of switching between a plurality of output torque lines.

In the wheel loader according to the second aspect of the present invention, when the conditions for determination are satisfied engine output torque can be increased, thus the required engine output torque in conformance with the condition of travel and the condition of work can be obtained.

In the wheel loader according to the third aspect of the present invention, when the conditions for determination are satisfied, the upper value of engine output torque that is a value between the output torque line and the predetermined torque characteristics can be obtained.

In the wheel loader according to the fourth aspect of the present invention, the upper value of the engine output torque can be reduced as vehicle speed is getting higher. When vehicle speed is high, it is usually the case that the load on the working machine or the travel mechanism is small, thus even though the upper value of engine output torque is made to reduce there is little impact on operability. Further, reducing the upper value of engine output torque improves fuel economy.

In the wheel loader according to the fifth aspect of the present invention the upper value of the engine output torque can be reduced as tractive force is getting higher. Accordingly, when tractive force is sufficiently high fuel economy can be improved by reducing the upper value of engine output torque. In other words, the upper value of engine output torque can be increased as tractive force is getting lower. In this way, tractive force can be increased, providing improved workability.

In the wheel loader according to the sixth aspect of the present invention, when vehicle speed is low and tractive force is high, even during a dump approach, the upper value of engine output torque is maintained at the same level as the value obtained from the predetermined torque characteristics. In this way, it is possible to prevent unnecessary increase in engine output torque.

In the wheel loader according to the seventh aspect of the present invention, when the conditions for determination are satisfied, the upper value of engine output torque is set to a value that is reduced below even the upper value of engine output torque from the output torque line.

In the wheel loader according to the eighth aspect of the present invention, when the conditions for determination are satisfied, the upper value of engine output torque is set such that engine output horsepower is a value between a first horsepower of the output torque line and a second horsepower of predetermined torque characteristics.

In the wheel loader according to the ninth aspect of the present invention, the upper value of engine output torque can be obtained from a map.

The wheel loader according to the tenth aspect of the present invention, provides what is known as HST (Hydro Static Transmission). Accordingly, in a wheel loader providing an HST, improved fuel economy and improved operability can be realized.

The wheel loader according to the eleventh aspect of the present invention enables tractive force to be accurately calculated.

In the wheel loader according to the twelfth aspect of the present invention, regardless of the level of vehicle speed and tractive force, fuel economy is improved in comparison to the case in which engine output torque is controlled based on the output torque line. Further, operability is improved in comparison to the case of switching between a plurality of output torque lines.

In the wheel loader according to the thirteenth aspect of the present invention, when the conditions for determination are not satisfied, engine output torque is controlled based on predetermined torque characteristics. The upper value of engine output torque from these predetermined torque characteristics is less than the upper value of engine output torque from the output torque line. This enables improved fuel economy.

When the conditions for determination are satisfied, engine output torque is controlled based on the torque upper value information. The conditions for determination are conditions that show that the vehicle is performing a dump approach, thus, during a dump approach, engine output torque is controlled based on the torque upper value information. The torque upper value information defines the upper value of engine output torque that changes in conformance with vehicle speed and tractive force. For this reason, engine output torque can be appropriately controlled in conformance with the level of vehicle speed and tractive force. Accordingly, regardless of the level of vehicle speed and tractive force, fuel economy is improved in comparison to the case in which engine output torque is controlled based on output torque line. Further, operability is improved in comparison to the case of switching between a plurality of output torque lines.

BRIEF DESCRIPTION OF THE DRAWINGS

FIG. 8 is a diagram showing an example of torque information; and

DESCRIPTION OF THE EMBODIMENTS

Figure 1:
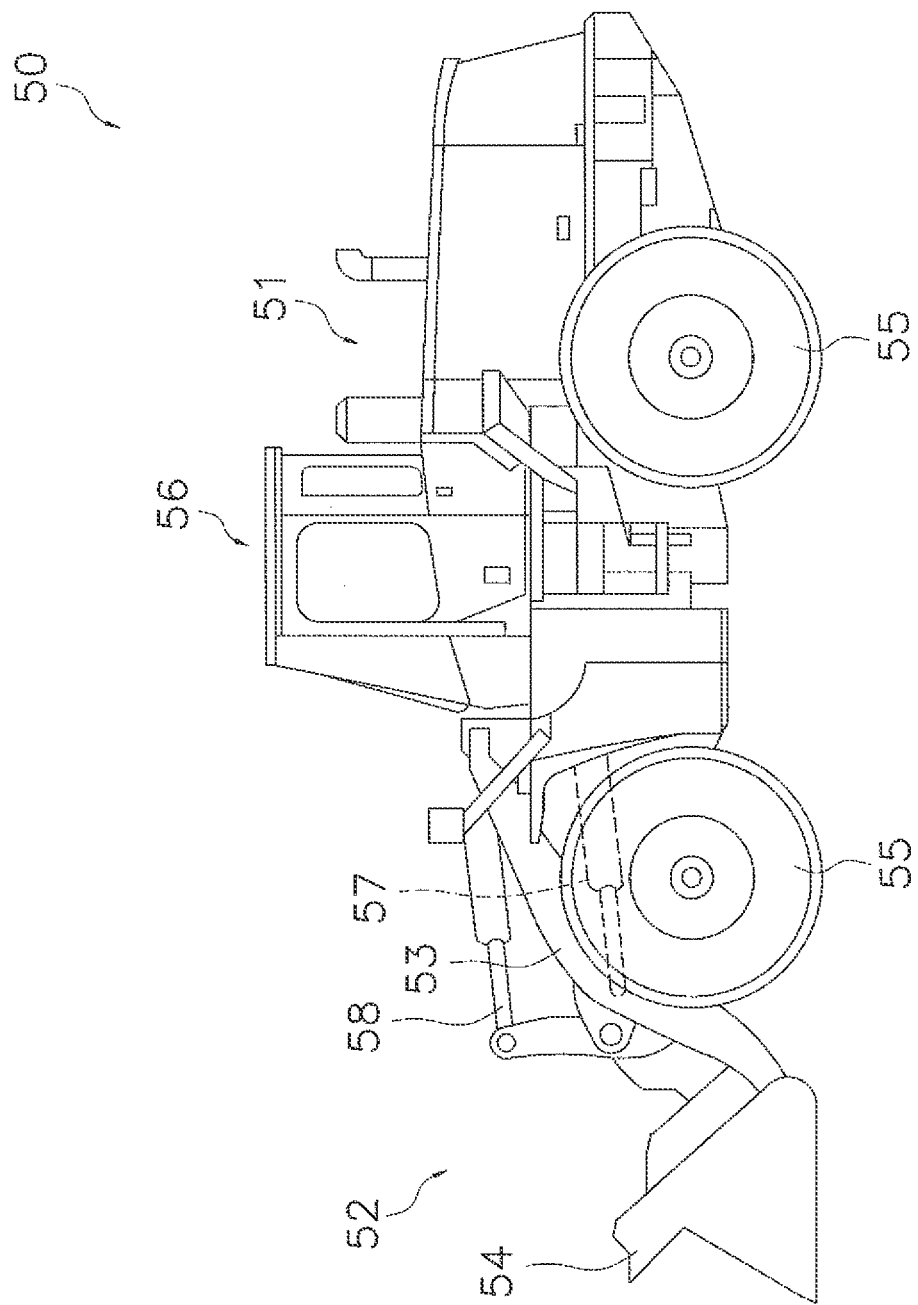
FIG. 1 is a side view showing a configuration of a wheel loader according to an embodiment of the present invention.

A wheel loader 50 according to a first embodiment of the present invention will now be described with reference to the drawings. FIG. 1 is a side view of the wheel loader 50. The wheel loader 50 provides a body 51, a working machine 52, a plurality of tires 55, and a cab 56. The working machine 52 is installed at the front part of the body 51. The working machine 52 has a boom 53, a bucket 54, a lift cylinder 57 and a bucket cylinder 58. The boom 53 is a member used for lifting up the bucket 54. The boom 53 is driven by the lift cylinder 57. The bucket 54 is attached at the end of the boom 53. The bucket 54 can be made to dump or tilt by the bucket cylinder 58. The cab 56 is installed in position over the body 51.

Figure 2:
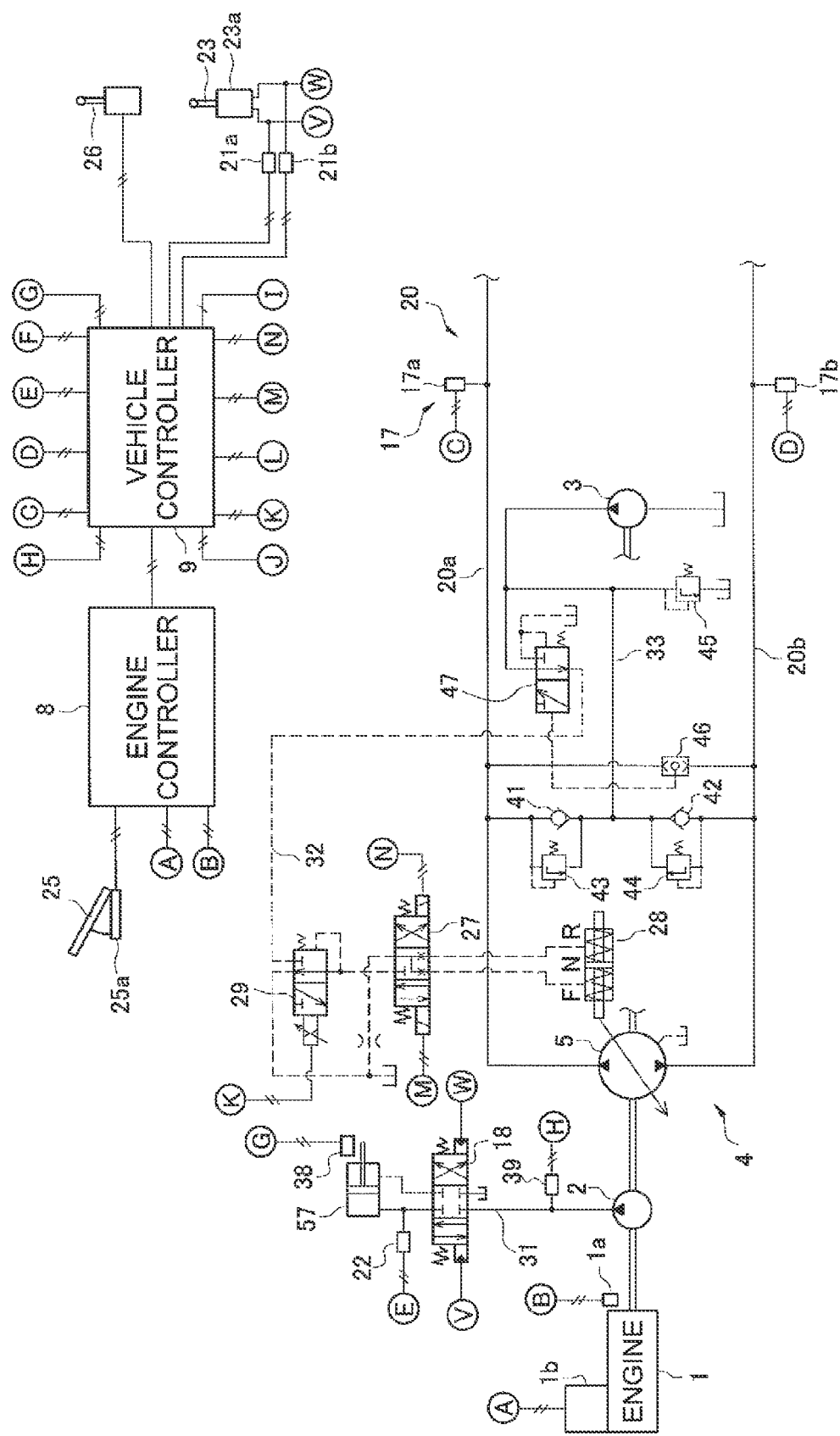
FIG. 2 is a hydraulic circuit diagram of the HST system installed in the wheel loader.
Figure 3:
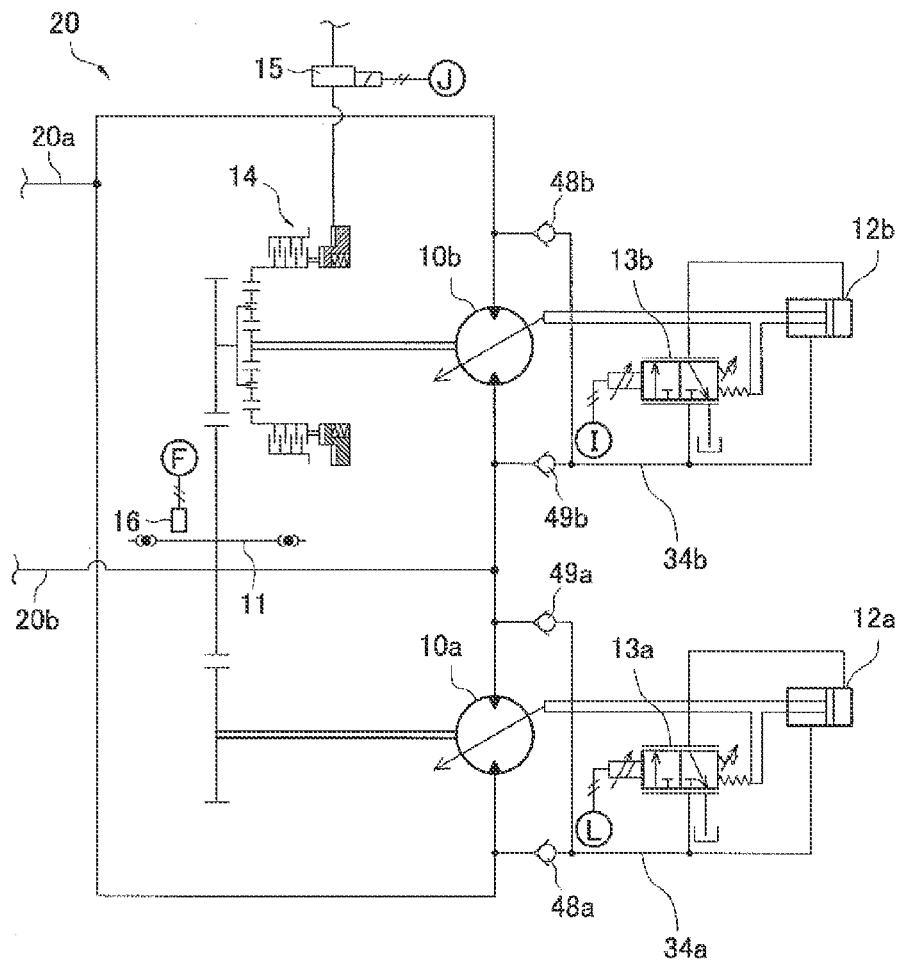
FIG. 3 is a hydraulic circuit diagram of the ENT system installed in the wheel loader.

FIG. 2 and FIG. 3 are block diagrams showing the configuration of the hydraulic circuit installed in the wheel loader 50. The wheel loader 50 provides chiefly, an engine 1, a working machine hydraulic pump 2, a charge pump 3, a travel mechanism 4, an engine controller 8 and a vehicle controller 9.

The engine 1 is a diesel engine. Output torque generated from the engine 1 is conveyed to the working machine hydraulic pump 2, the charge pump 3 and the travel mechanism 4. The actual rotation speed of the engine 1 is detected by an engine rotation speed sensor 1a. Further, a fuel injection device 1b is connected to the engine 1. An engine controller 8, described subsequently, controls the output torque of the engine 1 (hereinafter "engine output torque") and the rotation speed of the engine 1 by controlling a fuel injection device 1b in conformance with a target engine rotation speed as set.

The travel mechanism 4 causes the wheel loader 50 to travel through the drive force from the engine 1. The travel mechanism 4 provides a first hydraulic motor 10a, a second hydraulic motor 10b and a drive hydraulic circuit 20.

The travel hydraulic pump 5 discharges hydraulic fluid utilizing drive force from the engine 1. The travel hydraulic pump 5 is a variable capacity type hydraulic pump. Hydraulic fuel discharged from the travel hydraulic pump 5 passes the drive hydraulic circuit 20 and is delivered to the first hydraulic motor 10a and the second hydraulic motor 10b. The travel hydraulic pump 5 can vary the direction of discharge of hydraulic fluid. Basically, the drive hydraulic circuit 20 provides a first drive circuit 20a and a second drive circuit 20b.

As hydraulic fluid is supplied from the travel hydraulic pump 5 via the first drive circuit 20a to the first hydraulic motor 10a and the second hydraulic motor 10b the first hydraulic motor 10a and the second hydraulic motor 10b are driven in one direction (e.g., the forward direction). In this case, the hydraulic fluid returns to the travel hydraulic pump 5 from the first hydraulic motor 10a and the second hydraulic motor 10b via the second drive circuit 20b. As hydraulic fluid is supplied from the travel hydraulic pump 5 via the second drive circuit 20b to the first hydraulic motor 10a and the second hydraulic motor 10b the first hydraulic motor 10a and the second hydraulic motor 10b are driven in the other direction (e.g. the reverse direction). In this case, the hydraulic fluid returns to the travel hydraulic pump 5 from the first hydraulic motor 10a and the second hydraulic motor 10b via the first drive circuit 20a.

The wheel loader 50 is made to travel as the above described tires 55 are driven to rotate via a drive shaft 11 by the first hydraulic motor 10a and the second hydraulic motor 10b. In other words the wheel loader 50 employs what is called a 1-pump 2-motor HST system.

A drive circuit pressure detection part 17 is installed in the drive hydraulic circuit 20. The drive circuit pressure detection part 17 detects the pressure of hydraulic fluid (hereinafter "drive circuit pressure") supplied to the first hydraulic motor 10a and the second hydraulic motor 10b via the first drive circuit 20a or the second drive circuit 20b. Basically, the drive circuit pressure detection part 17 has a first drive circuit pressure sensor 17a and a second drive circuit pressure sensor 17b. The first drive circuit pressure sensor 17a detects the hydraulic pressure of the first drive circuit 20a. The second drive circuit pressure sensor 17b detects the hydraulic pressure of the second drive circuit 20b. The first drive circuit pressure sensor 17a and the second drive circuit pressure sensor 17b send detection signals to the vehicle controller 9. Further, a forward/reverse switching valve 27 and a pump capacity control cylinder 28 are connected to the travel hydraulic pump 5 to control the direction of discharge from the travel hydraulic pump 5.

The forward-reverse switching valve 27 is an electromagnetic control valve that switches the direction of hydraulic fluid supplied to the pump capacity control cylinder 28 based on a control signal from the vehicle controller 9. The forward/reverse switching valve 27, by switching the direction in which hydraulic fluid is supplied to the pump capacity control cylinder 28, switches the direction of discharge from the travel hydraulic pump 5. Basically, the forward/reverse switching valve 27 switches the direction of discharge from the travel hydraulic pump 5 between discharge to the first drive circuit 20a and discharge to the second drive circuit 20b.

The pump capacity control cylinder 28 is driven by hydraulic fluid supplied via a pump pilot circuit 32 and changes the tilting angle of the travel hydraulic pump 5. The pump capacity control cylinder 28 controls the capacity of the travel hydraulic pump 5 in conformance with the pressure of hydraulic fluid (hereinafter "pump pilot pressure") supplied to the pump capacity control cylinder 28 via the pump pilot circuit 32. Further, the pump capacity control cylinder 28 switches the direction of discharge of hydraulic fluid from the travel hydraulic pump 5 in conformance with the direction in which the hydraulic fluid is supplied to the pump capacity control cylinder 28.

A pressure control valve 29 is arranged in the pump pilot circuit 32. The pressure control valve 29 connects the pump capacity control cylinder 28 to either of the pump pilot circuit 32 and a hydraulic fluid tank. The pressure control valve 29 is an electromagnetic control valve controlled based on a control signal from the vehicle controller 9. The pressure control valve 29 adjusts the tilting angle of the travel hydraulic pump 5 by controlling pump pilot pressure. Control of the pressure control valve 29 from the vehicle controller 9 is described subsequently.

The pump pilot circuit 32 is connected to a charge circuit 33 and the hydraulic fluid tank via a cutoff valve 47. The pilot port of the cutoff valve 47 is connected to the first drive circuit 20a and the second drive circuit 20b via a shuttle valve 46. The shuttle valve 46 introduces whichever hydraulic pressure is greatest between the first drive circuit 20a and the second drive circuit 20b to the pilot port of the cutoff valve 47. In this way, drive circuit pressure is applied to the pilot port of the cutoff valve 47.

The cutoff valve 47 links the charge circuit 33 and the pump pilot circuit 32 when drive circuit pressure is lower than a predetermined cutoff pressure. In this way hydraulic fluid is supplied from the charge circuit 33 to the pump pilot circuit 32. When drive circuit pressure is more than or equal to a predetermined cutoff pressure the cutoff valve 47 opens. In this way, the cutoff valve 47 links the pump pilot circuit 32 to the hydraulic fluid tank and releases hydraulic fluid of the pump pilot circuit 32 to the hydraulic fluid tank. In this way, the capacity of the travel hydraulic pump 5 is reduced by decrease in the hydraulic pressure of the pump pilot circuit 32, preventing a rise in drive circuit pressure. That is to say, the cutoff valve 47 adjusts such that the hydraulic pressure of the first drive circuit 20a and the hydraulic pressure of the second drive circuit 20b do not exceed the cutoff pressure.

The charge pump 3, driven by the engine 1, is a pump for supplying hydraulic fluid to the drive hydraulic circuit 20. The charge pump 3 is connected to the Charge circuit 33, and supplies hydraulic fluid to the pump pilot circuit 32 via the charge circuit 33.

The charge circuit 33 is connected to the first drive circuit 20a via a first check valve 41. The first check valve 41 allows flow of hydraulic fluid from the charge circuit 33 to the first drive circuit 20a but restricts flow of hydraulic fluid from the first drive circuit 20a to the charge circuit 33. The charge circuit 33 is connected to the second drive circuit 20b via a second check valve 42. The second check valve 42 allows flow of hydraulic fluid from the charge circuit 33 to the second drive circuit 20b hut restricts flow of hydraulic fluid from the second drive circuit 20b to the charge circuit 33.

The charge circuit 33 is connected to the first drive circuit 20a via a first relief valve 43. The first relief valve 43 opens when the hydraulic pressure of the first drive circuit 20a is greater than a predetermined pressure. The charge circuit 33 is connected to the second drive circuit 20b via a second relief valve 44. The second relief valve 44 opens when the hydraulic pressure of the second drive circuit 20b is greater than a predetermined pressure.

The charge circuit 33 is connected to the hydraulic fluid tank via a low pressure relief valve 45. The low pressure relief valve 45 opens when the hydraulic pressure of the charge circuit 33 is greater than a predetermined relief pressure. In this way, drive circuit pressure is adjusted so as not to exceed a predetermined relief pressure. The predetermined relief pressure of the low pressure relief valve 45 is relatively low in comparison to the relief pressure of the first relief valve 43 and the relief pressure of the second relief valve 44. Accordingly, when drive circuit pressure is lower than hydraulic pressure of the charge circuit 33, hydraulic fluid is supplied from the charge circuit 33 to the drive hydraulic circuit 20 via the first check valve 41 or the second check valve 42.

The working machine hydraulic pump 2 is driven by the engine 1. The working machine hydraulic pump 2 is a hydraulic pump for driving the working machine 52. Hydraulic fluid discharged from the working machine hydraulic pump 2 is supplied to the lift cylinder 57 via a working machine hydraulic circuit 31, thereby driving the working machine 52. Further, hydraulic fluid discharged from the working machine hydraulic pump 2 is supplied to a steering cylinder (not shown in the drawings) via the working machine hydraulic circuit 31. In this way, the orientation of the vehicle is changed. The discharge pressure of the working machine hydraulic pump 2 is detected a discharge pressure sensor 39. The discharge pressure sensor 39 sends a detection signal to the vehicle controller 9.

A working machine control valve 18 is installed in the working machine hydraulic circuit 31. The working machine control valve 18 is driven in compliance with the degree of operation of a working machine operating part 23. The working machine control valve 18 controls the flow quantity of hydraulic fluid supplied to the lift cylinder 57 in compliance with pilot pressure applied to a pilot port. Pilot pressure applied to the pilot port of the working machine control valve 18 is controlled by a pilot valve 23a of the working machine operating part 23. The pilot valve 23a applies pilot pressure to the pilot port of the working machine control valve 18 in compliance with the degree of operation of the working machine operating part 23. In this way, the lift cylinder 57 is controlled in compliance with the degree of operation of the working machine operating part 23.

Pilot pressure applied to the pilot port (hereinafter "PPC pressure") of the working machine control valve 18 is detected by a PPC pressure sensor 21a and a PPC pressure sensor 21b. Further, the pressure of hydraulic fluid supplied to the lift cylinder 57 is detected by a boom pressure sensor 22. The PPC pressure sensors 21a and 22b and the boom pressure sensor 22 send detection signals to the vehicle controller 9.

The first hydraulic motor 10a and the second hydraulic motor 10b shown in FIG. 3 are variable capacity type hydraulic motors. The first hydraulic motor 10a and the second hydraulic motor 10b are driven by hydraulic fluid discharged from the travel hydraulic pump 5. The first hydraulic motor 10a and the second hydraulic motor 10b are motors that facilitate travel by generating drive force in order to rotate the tires 55. The drive direction of the first hydraulic motor 10a and the second hydraulic motor 10b changes to the forward direction and the reverse direction in conformance with the direction of discharge of hydraulic fluid from the travel hydraulic pump 5.

A motor cylinder 12a and motor capacity control part 13a are installed in the first hydraulic motor 10a. The motor cylinder 12a changes the tilting angle of the first hydraulic motor 10a. The motor capacity control part 13a is an electromagnetic valve controlled based on control signals from the vehicle controller 9. The motor capacity control part 13a controls the motor cylinder 12a based on control signals from the vehicle controller 9.

The motor cylinder 12a and the motor capacity control part 13a are connected to a motor pilot circuit 34a. The motor pilot circuit 34a is connected to the first drive circuit 20a via a check valve 48a. The check valve 48a allows flow of hydraulic fluid from the first drive circuit 20a to the motor pilot circuit 34a but restricts flow of hydraulic fluid from the motor pilot circuit 34a to the first drive circuit 20a. The motor pilot circuit 34a is connected to the second drive circuit 20b via a check valve 49a. The check valve 49a allows flow of hydraulic fluid from the second drive circuit 20b to the motor pilot circuit 34a but restricts flow of hydraulic fluid from the motor pilot circuit 34a to the second drive circuit 20b. Through operation of the check valve 48a and the check valve 49a, whichever hydraulic pressure is greatest between the first drive circuit 20a and the second drive circuit 20b, in other words hydraulic fluid from drive circuit pressure, is supplied to the motor pilot circuit 34a.

The motor capacity control part 13a switches the supply flow volume and direction of supply of hydraulic fluid to the motor cylinder 12a from the motor pilot circuit 34a, based on control signals from the vehicle controller 9. In this way, the vehicle controller 9 can freely change the capacity of the first hydraulic motor 10a. Further, the vehicle controller 9 can set the upper limit capacity and lower limit of capacity of the first hydraulic motor 10a as required.

The second hydraulic motor lab is disposed in parallel with the first hydraulic motor 10a in the drive hydraulic circuit 20. A motor cylinder 12b and motor capacity control part 13b are provided in the second hydraulic motor 10b. The motor cylinder 12b changes the tilting angle of the second hydraulic motor 10b. The motor capacity control part 13b is an electromagnetic control valve controlled based on control signals from the vehicle controller 9. The motor capacity control part 13b controls the motor cylinder 12b based on control signals from the vehicle controller 9.

The motor cylinder 12b and the motor capacity control part 13b are connected to a motor pilot circuit 34b. The motor pilot circuit 34b is connected to the first drive circuit 20a via a check valve 48b. The check valve 48b allows flow of hydraulic fluid from the first drive circuit 20a to the motor pilot circuit 34b but restricts flow of hydraulic fluid from the motor pilot circuit 34b to the first drive circuit 20a. The motor pilot circuit 34b is connected to the second drive circuit 20b via a check valve 49b. The check valve 49b allows flow of hydraulic fluid from the second drive circuit 20b to the motor pilot circuit 34b but restricts flow of hydraulic fluid from the motor pilot circuit 34b to the second drive circuit 20b. Through operation of the check valve 48b and the check valve 49b, whichever hydraulic pressure is greatest between the first drive circuit 20a and the second drive circuit 20b, in other words hydraulic fluid from drive circuit pressure, is supplied to the motor pilot circuit 34b.

The motor capacity control part 13b switches the supply flow volume and direction of supply of hydraulic fluid to the motor cylinder 12b from the motor pilot circuit 34b, based on control signals from the vehicle controller 9. In this way, the vehicle controller 9 can freely change the capacity of the second hydraulic motor 10b. Further, the vehicle controller 9 can set the upper limit capacity and lower limit of capacity of the second hydraulic motor 10b as required.

The second hydraulic motor 10b is communicatively linked to the drive shaft 11 via a clutch 14. The clutch 14 is a device for switching between transmission and non-transmission of drive power from the second hydraulic motor 10b to the drive shaft 11. A clutch control valve 15 for switching between engagement and non-engagement of the clutch 14 is installed in the clutch 14. The clutch control valve 15 is an electromagnetic control valve for switching between engagement and non-engagement of the clutch 14 based on control signals from the vehicle controller 9. During low-speed travel, the clutch 14 is in the engaged condition, and drive power from the first hydraulic motor 10a and the second hydraulic motor 10b is conveyed to the drive shaft 11. During high-speed travel, the clutch 14 is in the non-engaged condition and only drive power of the first hydraulic motor 10a is conveyed to the drive shaft 11.

The wheel loader 50 provides a vehicle speed detection part 16. The vehicle speed detection part 16 detects vehicle speed and sends a vehicle speed signal to the vehicle controller 9. The vehicle speed detection part 16 detects vehicle speed by for example detecting the rotation speed of the drive shaft 11.

As shown in FIG. 2, the wheel loader 50 provides an accelerator operating member 25 and a forward/reverse operation member 26. The accelerator operating member 25 is a member that enables an operator to set a target engine rotation vehicle speed and is for example, an accelerator pedal operated by the operator. The accelerator operating member 25 is connected to an accelerator operation sensor 25a. The accelerator operation sensor 25a is comprised as, for example, a potentiometer. The accelerator operation sensor 25a sends an opening degree signal that shows the degree of operation of the accelerator operating member 25 (hereinafter "degree of accelerator operation") to the engine controller 8. The operator, by adjusting the degree of accelerator operation is able to control the rotation speed of the engine 1.

The forward/reverse operation member 26 is operated by the operator to switch the vehicle between forward and reverse travel. The position of operation of the forward/reverse operation member 26 can be switched between a forward travel position, a reverse travel position and neutral. The forward/reverse operation member 26 sends a signal to the vehicle controller 9, showing the state of operation that indicates the position of the forward/reverse operation member 26. The operator, by operating the forward/reverse operation member 26, is able to switch the wheel loader 50 between forward travel and reverse travel.

The engine controller 8 is an electronic control part providing an arithmetic unit such as a CPU, or different kinds of memory. The engine controller 8 controls the engine 1 so as to obtain a target rotation speed as set.

Figure 4:
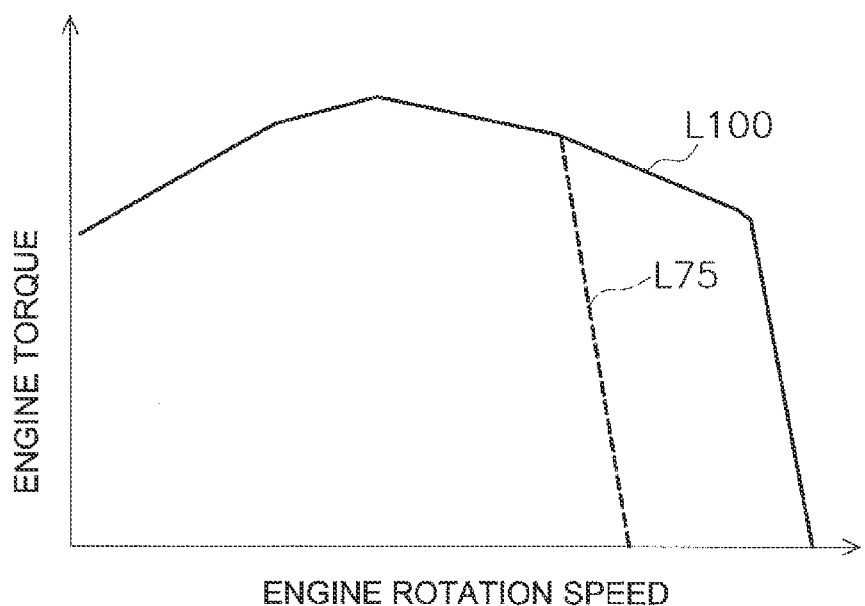
FIG. 4 is a diagram showing an example of engine output torque line.

FIG. 4 shows an output torque line of the engine 1. Output torque line of the engine 1 defines the relationship between rotation speed of the engine 1 and the upper value of engine output torque (hereinafter "torque upper value") at each rotation speed. In FIG. 4 the solid line L100 shows the engine output torque line when the degree of accelerator operation is 100%. This engine output torque line is for example, equivalent to the rated value of the engine 1 or maximum power output.

Degree of accelerator operation at 100% means the condition in which the accelerator operating member 25 is shifted to the maximum extent. Again, the short dashed line L75 shows the output torque line when the degree of accelerator operation is 75%. The engine controller 8 controls output of the engine 1 such that engine output torque is below the output torque line. This control of output of the engine 1 is performed for example, by controlling the upper value of the quantity of fuel injected to the engine 1.

The vehicle controller 9 is an electronic control part providing an arithmetic unit such as a CPU, or different kinds of memory. The vehicle controller 9 controls the capacity of the travel hydraulic pump 5, the capacity of the first hydraulic motor 10a and the capacity of the second hydraulic motor 10b, by electronic control of each control valve based on output signals from each detection part. Basically, the vehicle controller 9 outputs to the pressure control valve 29, an instruction signal based on engine rotation speed detected by the engine rotation speed sensor 1a. The relationship between pump capacity and drive circuit pressure is defined in this way.

Figure 5:
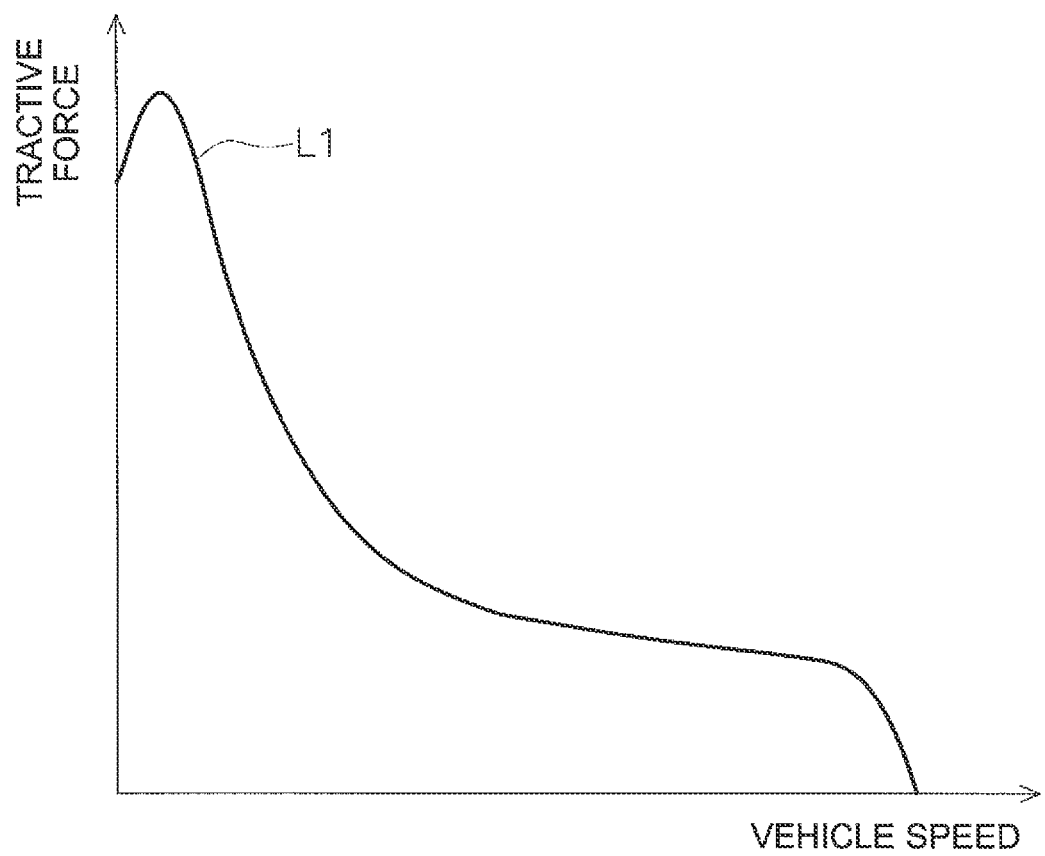
FIG. 5 is a diagram showing an example of a graph of vehicle speed to tractive force.

The vehicle controller 9 processes output signals from the engine rotation speed sensor 1a and the drive circuit pressure detection part 17 and outputs motor capacity instruction signals to the motor capacity control part 13a. Here, the vehicle controller 9 references the motor capacity-drive circuit pressure characteristics stored in the vehicle controller 9 and sets motor capacity from the value for engine rotation speed and the value for drive circuit pressure. The vehicle controller 9 outputs change instructions for tilting angle in conformance with motor capacity as set, to the motor capacity control part 13a. As shown by L1 in FIG. 5, in the wheel loader 50 tractive force and vehicle speed change seamlessly without stages, enabling automatic vehicle speed change from zero to maximum vehicle speed with no speed change operation. FIG. 5 is a graph that shows vehicle speed to tractive force when the degree of accelerator operation is at maximum.

Figure 6:
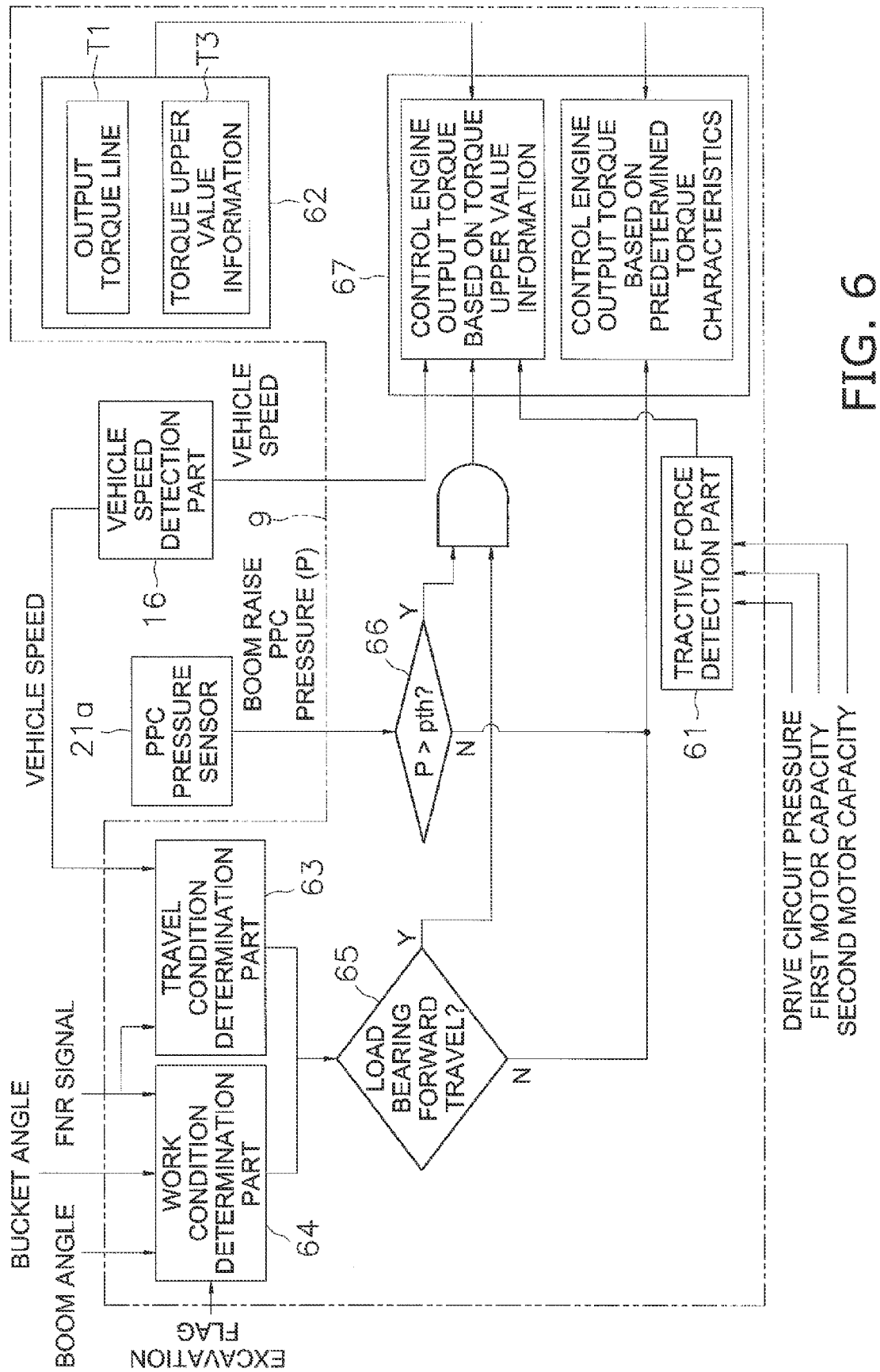
FIG. 6 A block diagram of the control system of the wheel loader.

FIG. 6 is a block diagram of the control system of the vehicle controller 9. The vehicle controller 9 provides a tractive force detection part 61, a memory part 62, a travel condition determination part 63, a work condition determination part 64, a work phase determination part 65, a raise operation determination part 66 and an engine output torque control part 67.

The tractive force detection part 61 detects tractive force of the vehicle, and calculates the tractive force of the vehicle using formula 1 below.

$$F = \beta \times F\text{max} \qquad \text{Formula 1}$$

F represents the tractive force of the vehicle. β shows the traction ratio. Fmax is the maximum tractive force of the vehicle. Maximum tractive force Fmax is a constant, stored in the memory part 62.

The traction ratio β is calculated according to formula 2 below.

$$\beta = \frac{P \times (Rm1 \times q1 + Rm2 \times q2)}{Pco \times (Rm1 \times q1\text{max} + Rm2 \times q2\text{max})} \qquad \text{Formula 2}$$

P is the current pressure difference between the first drive circuit and the second drive circuit. P is obtained from a detection signal from the drive circuit pressure sensor part 17.

Rm1 is the rate of speed decrease of the first hydraulic motor 10a. Rm2 is the rate of speed decrease of the second hydraulic motor 10b. Rm1 and Rm2 are constants stored in the memory part 62. q1 is the first motor capacity, the current capacity of the first hydraulic motor 10a. q2 is the second motor capacity, the current capacity of the second hydraulic motor 10b. The first motor capacity q1 and the second motor capacity q2 are obtained from instruction values sent from the vehicle controller 9 to the motor capacity control parts 13a and 13b.

Pco is the pressure difference between the first drive circuit 20a and the second drive circuit 20b when the cutoff valve 47 is open. Pco is a constant, stored in the memory part 62. q1max is the maximum capacity at the first hydraulic motor 10a. q2max is the maximum capacity of the second hydraulic motor 10b. q1max and q2max are constants stored in the memory part 62.

Figure 7:
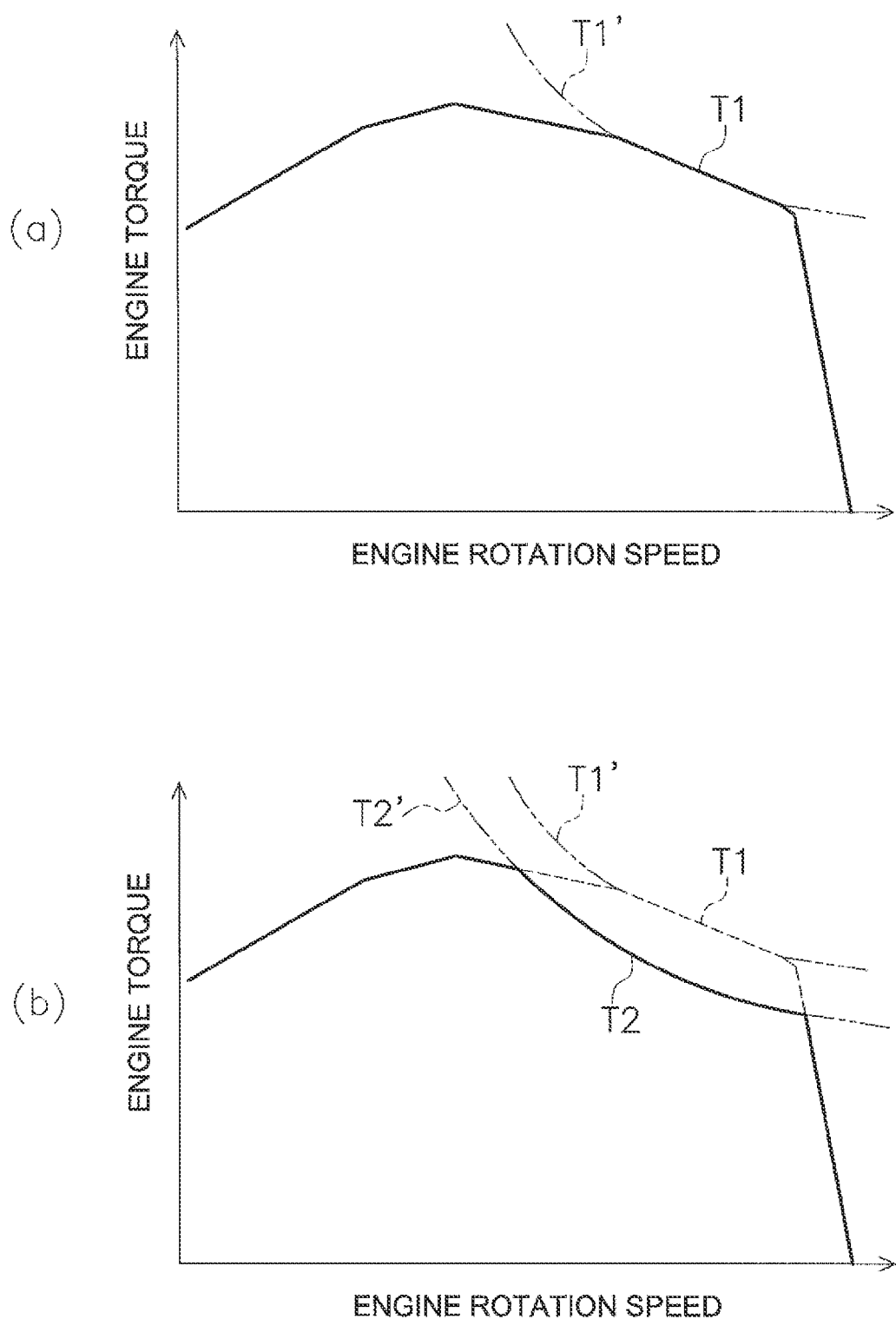
FIG. 7 A diagram showing an example of output torque line to predetermined torque characteristics.

The memory part 62 stores information necessary for processes performed the vehicle controller 9. The memory part 62 stores output torque line of the above mentioned engine 1 FIG. 7(a) shows an exemplary output torque line T1. FIG. 7(b) shows exemplary predetermined torque characteristics T2 calculated from the output torque line T1. Note that the output torque line T1 shown in FIG. 7 shows the output torque line when the degree of accelerator operation is at 100%.

The output torque line T1 corresponds to engine 1 maximum power output. Accordingly, the output torque line T1 agrees with the solid line L100 showing output torque line in FIG. 4. The output torque line T1 includes the first constant horse power line T1' where output horsepower of the engine is constant at the first horsepower.

The predetermined torque characteristics T2 define the torque upper value which is less than the torque upper value from the output torque line T1 for part of the range of engine rotation speed. The predetermined torque characteristics T2 include characteristics where engine output horsepower becomes constant at the second horsepower (see T2'). The second horse power is a value obtained by multiplying the first horsepower by a predetermined ratio that is less than 100%, taking the first horsepower to be 100%. Accordingly, the second horsepower is less than the first horsepower. For this reason, for part of the range of engine rotation speed if engine rotation speed is the same the torque upper value determined based on the predetermined torque characteristics T2 is smaller than the torque upper value determined based on the output torque line T1. Note that the predetermined ratio is stored in the memory part 62.

Further, the memory part 62 stores torque upper value information T3. Torque upper value information T3 defines torque upper value that changes in conformance with vehicle speed and tractive force. The torque upper value information T3 is used when predetermined conditions for determination are satisfied. The torque upper value information T3 and the conditions for determination are described subsequently.

The travel condition determination part 63 determines whether or not the travel condition of the vehicle is forward travel. The travel condition determination part 63 determines the travel condition based on FNR signals from the forward/reverse operation member 26 and detection signals from the vehicle detection part 16. The travel conditions include for example forward, reverse and stationary. An FNR signal is a signal that shows the position of operation of the forward/reverse operation member 26. The travel condition determination part 63 determines that the travel condition is forward travel with the forward/reverse operation member 26 in the forward position, when vehicle speed is greater than or equal to a predetermined speed.

The work condition determination part 64 determines whether or not the work condition of the working machine 52 is the laden condition. The work condition determination part 64 determines the work condition based on an excavation flag, boom angle, bucket angle and FNR signals. The work conditions include for example laden, unladen and excavation. Laden condition indicates that a load is loaded in the bucket 54. Unladen indicates that no load is loaded in the bucket 54. Excavation indicates that the bucket 54 is being used for excavation.

The excavation flag shows whether or not the wheel loader 50 is performing excavation. The excavation flag being ON indicates that the wheel loader 50 is performing excavation. For example, when the forward/reverse operation member 26 is in the forward travel position, the boom angle is less than or equal to a predetermined angle threshold and the boom bottom pressure is greater than or equal to a predetermined pressure threshold, the work condition determination part 64 sets the excavation flag to ON. The boom angle is an angle in relation to the horizontal direction of the boom 53, and the predetermined angle threshold corresponds to the boom angle when the bucket 54 is in a position close to the ground surface. Boom bottom pressure is the hydraulic pressure supplied to the lift cylinder 57 when the lift cylinder 57 is made to extend.

The bucket angle is an angle in relation to the horizontal direction of the lower surface of the bucket 54. The bucket angle is detected based on detection signals from an angle sensor attached to the bucket 54. It is also suitable to calculate bucket angle from the degree of stroke of the bucket cylinder 58.

The work condition determination part 64 determines that the work condition is laden condition for example, with the work condition in the excavation condition, when the forward/reverse operation member 26 has switched from forward travel to another position. Alternatively, the work condition determination part 64 determines that the work condition is laden condition, with the work condition in the unladen condition, when the boom bottom pressure continues to be in a condition greater than or equal to a predetermined pressure threshold for greater than or equal to a predetermined time, moreover, the bucket angle is greater than or equal to horizontal.

The work phase determination part 65 determines whether or not the work phase is laden forward travel. Laden forward travel means that the travel condition is forward travel, moreover the work condition is laden condition. The work phase determination part 65 determines the work phase based on the result of a determination from the travel condition determination part 63 and the result of a determination from the work condition determination part 64.

The raise operation determination part 66 determines whether or not a raise operation for the purpose of raising the working machine 52 is being performed from the working machine operating part 23. Basically, the raise operation determination part 66 determines whether or not a raise operation in order to raise the boom 53 is being performed from the working machine operating part 23. The raise operation determination part 66 determines whether or not a raise operation is being performed based on detection signals from the PPC pressure sensors 21a and 21b. When the PPC pressure for raising the boom 53 exceeds a predetermined pressure threshold pth, the raise operation determination part 66 determines that a raise operation is being performed.

The engine output torque control part 67 controls engine output torque based on torque upper value information 13 when the conditions for determination are satisfied. The engine output torque control part 67 controls engine output based on the predetermined torque characteristics T2 when the conditions for determination are not satisfied. The conditions for determination include that the travel condition is forward travel, moreover that the work condition is laden condition and that a raise operation is being performed. These conditions show that the wheel loader 50 is performing a dump approach.

FIG. 8 shows an example of torque upper value information T3. For this embodiment, the torque upper value information T3 is stored in the memory part 62 in a map format. The torque upper value information T3 defines the relationship between the rate of reduction, vehicle speed and tractive force. The rate of reduction is a rate by which the first horse power of the output torque line T1 is multiplied. In FIG. 8, a, b, c, d, e, show the respective rates for the rate of reduction. The same character stands for the same value. Further, v1<v2<...<v9<10, f1<f2<...<f9<f10. Note that the rate of reduction in relation to vehicle speed and tractive force within the values shown in FIG. 8, is calculated from linear interpolation.

The engine output torque control part 67 references the torque upper value information T3 and calculates the rate of reduction from the vehicle speed and tractive force. The engine output torque control part 67 determines the torque corresponding to the horsepower obtained by multiplying the first horse power of the output torque line T1 by the rate of reduction as the torque upper value. A control signal showing the torque upper value thus determined is sent from the vehicle controller 9 to the engine controller 8.

The rate of reduction of the torque upper value information T3 includes a value that is less than 100% and greater than the above predetermined ratio. For example, in FIG. 8, a is 100%, e is the same value as the above predetermined ratio. Further, a>b>c>d>e. That is to say b, c, dare less than 100%, moreover greater than the above predetermined ratio. Accordingly, the torque upper value information T3 defines the torque upper value information that changes in conformance with vehicle speed and tractive force, within a range between the torque upper value from the output torque line and the torque upper value from the predetermined torque characteristics.

As shown in FIG. 8, the torque upper value information T3 defines torque upper values that reduce in conformance with increase in vehicle speed where tractive force is the same. Further, the torque upper value information T3 defines the torque upper values that reduce in conformance with increase in tractive force where vehicle speed is the same.

The torque upper value information T3 defines the torque upper value of the same level as the predetermined torque characteristics T2, in relation to vehicle speed and tractive force in a range where vehicle speed is less than or equal to a predetermined speed threshold moreover tractive force is greater than or equal to a predetermined tractive force threshold. For example, in FIG. 8 when vehicle speed is less than or equal to v2 moreover tractive force is greater than or equal to f9, the rate of reduction is e. e is the same value as a predetermined ratio, thus torque corresponding to the horsepower obtained by multiplying the first horse power by the reduction rate e is the same level as the torque upper value obtained from the predetermined torque characteristics T2.

As described above, the wheel loader 50 according to this embodiment of the present invention controls engine output torque based on the predetermined torque characteristics T2 when the conditions for determination are not satisfied. Accordingly, improved fuel economy can be realized.

When the conditions for determination are satisfied, engine output torque is controlled based on the torque upper value information T3. The conditions for determination are conditions that show that the wheel loader 50 is performing a dump approach. Accordingly, during a dump approach, engine output torque is controlled based on the torque upper value information T3. Thus engine output torque can be appropriately controlled in conformance with the level of vehicle speed and tractive force.

Figure 9:
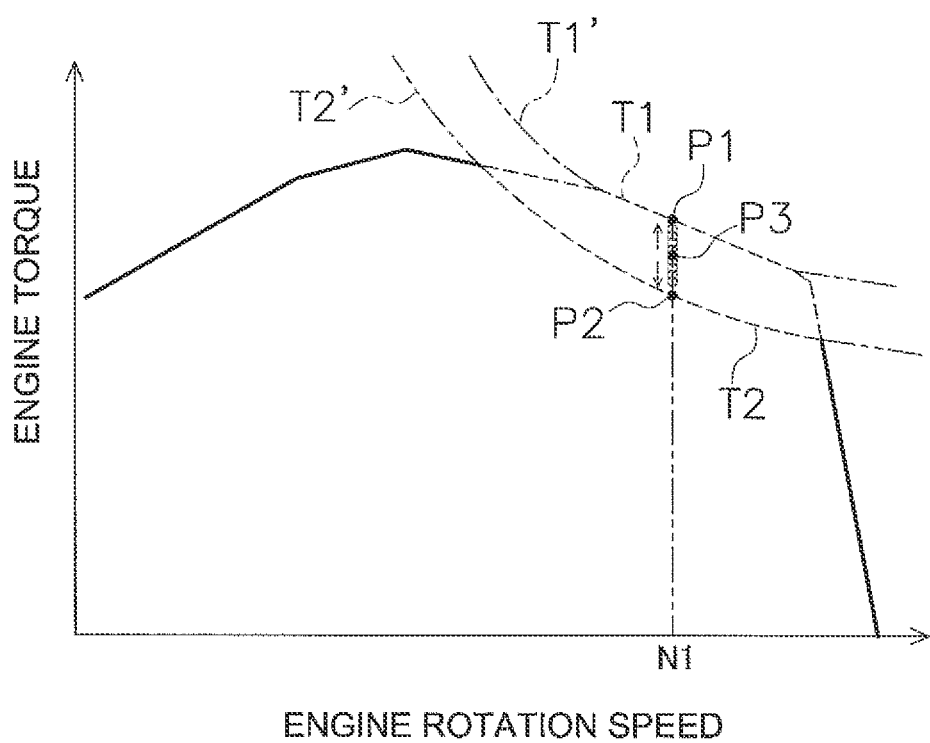
FIG. 9 is a diagram showing an example of engine output torque calculated based on torque information.

FIG. 9 shows an example of torque upper value calculated based on torque information. In FIG. 9 P1 shows the torque upper value calculated based on the output torque line T1 when engine rotation speed is at N1. P2 shows the torque upper value calculated based on the predetermined torque characteristics T2 when engine rotation speed is at N1. P3 shows an example of torque upper value calculated based on the torque upper value information T3 when engine rotation speed is at N1. P3 is determined in conformance with vehicle speed and tractive force based on the torque upper value information T3. Accordingly, P3 changes continuously in conformance with changes in vehicle speed and/or tractive force (see the arrows in FIG. 9).

As shown in FIG. 9, when the conditions for determination are satisfied, the torque upper value is net at a value between P1 and P2 in conformance with vehicle speed and tractive force. Accordingly, regardless of the level of vehicle speed and tractive force, fuel economy can be improved in comparison to the case in which engine output torque is controlled based on the output torque line T1. Further, engine output torque increases in conformance with vehicle speed and tractive force, in comparison to the case in which engine output torque is controlled based on the predetermined torque characteristics T2. In this way, travel ability and workability can be improved.

Again, the change in the output characteristics of the engine 1 is small in comparison to the case of switching between multiple output torque lines. Further, the change in the output characteristics of the engine 1 is small in comparison to the case in which the upper value of engine output torque changes from the upper value of engine output torque through the predetermined torque characteristics T2 to the upper value of engine output torque through the output torque line T1. For this reason, operability is improved.

Although the invention has been described above by reference to an embodiment thereof, the invention is not limited to the embodiment described above. It is therefore understood that numerous modifications and variations can be devised without departing from the scope of the invention.

The above embodiment has been described with reference to an example of a wheel loader mounting an FIST system of 1-pump 2-motors, including two hydraulic motors and one hydraulic pump as the travel mechanism. The invention is however, not limited to this configuration. For example, it is also suitable for the present invention to be applied to a wheel loader mounting an HST system of 1-pump 1-motor, including one hydraulic pump and one hydraulic motor.

In a 1-pump 1-motor HST system, in the calculation of tractive force in formula 1 described above, a traction ratio $\beta$ is used shown in formula 3 below, instead of the traction ratio $\beta$ of formula 2.

$$\beta = \frac{P \times q}{Pco \times q\max}$$ Formula 3

In formula 3, P and Pco are the same as P and Pco in formula 2. q is the current capacity of the hydraulic motor. qmax is the maximum capacity of the hydraulic motor.

In the above-described embodiment, an explanatory example of an HST system is provided for the travel mechanism, however is also suitable for the travel mechanism to be a mechanism that drives a drive shaft via a torque controller or transmission.

It is also suitable for an output torque line to define a torque upper value smaller than maximum output torque of the engine. In this case, it is suitable for the torque upper value information to include information that defines a torque upper value greater than the torque upper value from the output torque line. Further, it is also suitable for torque upper value information to differ from the torque upper value information T3 exemplified in the above-described embodiment. For example, the torque upper value information may include information that defines a torque upper value less than the torque upper value from predetermined torque characteristics.

It is suitable to employ conditions for determining travel condition that differ from the conditions exemplified in the above-described embodiment. It is also suitable to employ conditions for determining work condition that differ from the conditions exemplified in the above-described embodiment. Moreover, it is suitable to employ conditions for determining whether or not a raise operation is being performed that differ from the conditions exemplified in the above-described embodiment.

In the above-described embodiment, calculation of output torque is performed from torque upper value information in a range of engine rotation speed in which output horsepower of the engine is constant, however it is also suitable for calculation of output torque from torque upper value information to be performed outside the above engine rotation speed range.

In the above-described embodiment, the rate of reduction is a ratio by which the first horsepower is multiplied, however it is also suitable to use a ratio that multiplies torque upper value defined from an output torque line. Again, it is suitable for torque upper value information to include a numerical value that directly shows the torque upper value as substitute for a rate of reduction.

It is suitable for the torque upper value information to be in a format other than a map format. Moreover, it is suitable for the method of calculating tractive force to be a method other than the method in the above-described embodiment.

The wheel loader according to the illustrated embodiment realizes improved fuel economy and a high level of operability.

The invention claimed is:

1. A wheel loader comprising:
an engine;
a travel mechanism configured and arranged to cause a vehicle to ravel by utilizing drive force from the engine;
a working machine hydraulic pump configured and arranged to be driven by the engine to discharge hydraulic fluid;
a working machine configured and arranged to be driven by the hydraulic fluid discharged from the working machine hydraulic pump;
a working machine operating part configured and arranged to operate the working machine;
a vehicle speed detection part configured and arrangers to detect vehicle speed;
a tractive force detection part configured and arranged to detect tractive force of the vehicle;
a memory part configured and arranged to store an output torque line that defines a relationship between engine rotation speed and an upper value of engine output torque, and torque upper value information that defines the upper value of the engine output torque that changes according to the vehicle speed and the tractive force;
a travel condition determination part configured to determine whether or not a travel condition of the vehicle is forward travel;
a work condition determination part configured to determine whether or not a work condition of the vehicle is laden condition;
a raise operation determination part configured to determine whether or not a raise operation is being performed by the working machine operating part in order to raise the working machine; and
an engine output torque control part configured to control the engine output torque based on the torque upper value information when conditions for determination at least including that the travel condition is forward travel, that the work condition is laden condition and that the raise operation is being performed are satisfied, and to control the engine output torque based on predetermined torque characteristics obtained by multiplying by a predetermined ratio that is less than 100%, the upper value of the engine output torque in the engine output torque line, for at least a part of a range of the engine rotation speed, when the conditions for determination are not satisfied.

2. The wheel loader according to claim 1, wherein
the torque upper value information defines the upper value of the engine output torque greater than or equal to the upper value of the engine output torque from the predetermined torque characteristics.

3. The wheel loader according to claim 1, wherein
the torque upper value information defines the upper value of the engine output torque that changes according to the vehicle speed and the tractive force, for a range between the upper value of the engine output torque in the output torque line and the upper value of the engine output torque from the predetermined torque characteristics.

4. The wheel loader according to claim 1, wherein
the torque upper value information defines the upper value of the engine output torque that decreases according to an increase in the vehicle speed.

5. The wheel loader according to claim 1, wherein
the torque upper value information defines the upper value of the engine output torque that decreases according to an increase in the tractive force.

6. The wheel loader according to claim 1, wherein
the torque upper value information defines the upper value of the engine output torque at the same level as the predetermined torque characteristics, in relation to the vehicle speed that is within a range where the vehicle speed is less than or equal to a predetermined vehicle speed threshold and the tractive force that is within a range where the tractive is more than or equal to a predetermined tractive force threshold.

7. The wheel loader according to claim 1, wherein
the torque upper value information defines a relationship between the tractive force, the vehicle speed and a reduction rate in relation to the upper value of the engine output torque in the output torque line.

8. The wheel loader according to claim 7, wherein
the output torque line includes a first constant horsepower line where an engine output horsepower is constant at a first horsepower,
the predetermined torque characteristics have characteristics such that, the engine output horsepower is constant at a second horsepower that is obtained by multiplying the first horsepower by the predetermined ratio, taking the first horsepower as 100%, and the reduction rate, in the torque upper value information, is ratio by which the first horsepower is multiplied, and which includes values that are less than 100% and greater than the predetermined ratio.

9. The wheel loader according to claim 1, wherein the torque upper value information is mapped.

10. The wheel loader according to claim 1, wherein the travel mechanism has a travel hydraulic pump configured and arranged to be driven by the engine to discharge hydraulic fluid and a hydraulic motor configured and arranged to be driven by the hydraulic fluid discharged from the travel hydraulic pump.

11. The wheel loader according to claim 10, further comprising
a hydraulic circuit including a first drive circuit, a second drive circuit and a cutoff valve,
when hydraulic fluid is supplied to the hydraulic motor from the travel hydraulic pump via the first drive circuit, hydraulic fluid returns to the travel hydraulic pump from the hydraulic motor via the second drive circuit,
when hydraulic fluid is supplied to the hydraulic motor from the travel hydraulic pump via the second drive circuit, the hydraulic fluid returns to the travel hydraulic pump from the hydraulic motor via the first drive circuit,
the cutoff valve opens when either a hydraulic pressure of the first drive circuit or a hydraulic pressure of the second drive circuit is greater than or equal to a predetermined cutoff pressure thereby adjusting the hydraulic pressure of the first drive circuit and the hydraulic pressure of the second drive circuit not to exceed the predetermined cutoff pressure,
the tractive force detection part is configured to calculate the tractive force by multiplying maximum tractive force of the vehicle by a traction ratio, and
the tractive force detection part is further configured to calculate the traction ratio based on capacity of the hydraulic motor, maximum capacity of the hydraulic motor, pressure difference between the first drive circuit and the second drive circuit when the cutoff valve is open, and current pressure difference between the first drive circuit and the second drive circuit.

12. The wheel loader according claim 1, wherein the output torque line defines maximum output torque of the engine in relation to the engine rotation speed.

13. A method for controlling a wheel loader comprising:
detecting vehicle speed;
determining tractive force of a vehicle;
determining whether or not a travel condition of the vehicle is forward travel;
determining whether or not a work condition of a working machine is laden condition;
determining whether or not a raise operation is being performed in order to raise the working machine;
determining whether or not conditions for determination including at least that the travel condition is forward travel, that the work condition is laden condition and that the raise operation is being performed are satisfied;
controlling engine output torque based on torque upper value information when the conditions for determination are satisfied; and
controlling the engine output torque based on predetermined torque characteristics when the conditions for determination are not satisfied, wherein
an output torque line defines a relationship between the engine rotation speed and an upper value of the engine output torque,
the predetermined torque characteristics are obtained by multiplying by a predetermined ratio that is less than 100%, the upper value of the engine output torque in the engine output torque line, for at least a part of a range of engine rotation speed, and the torque upper value information defines the upper value of engine output torque that changes according to vehicle speed and tractive force.

* * * * *